United States Patent [19]
Wurm

[11] 3,787,598
[45] Jan. 22, 1974

[54] FURNACE AND METHOD FOR THE PYRO-CHEMICAL PROCESSING OF NUCLEAR REACTOR FUEL ELEMENTS

[75] Inventor: Joseph Wurm, Mol-Donk, Belgium

[73] Assignee: European Atomic Energy Community (Euratom), Luxemburg, European Center, Kirchberg, Luxembourg

[22] Filed: Jan. 25, 1971

[21] Appl. No.: 109,111

[30] Foreign Application Priority Data
Feb. 9, 1970  Netherlands .................. 7001798

[52] U.S. Cl. .................................. 13/22, 13/31
[51] Int. Cl. ..................... F27d 7/06, F27d 11/02
[58] Field of Search ............ 13/1, 20, 23, 31, 34, 22

[56] References Cited
UNITED STATES PATENTS 3,227,798  1/1966  Delange et al. .................. 13/22
3,387,079  6/1968  Hoppe et al. .................. 13/23 X
3,470,303  9/1969  Lundstrom .................. 13/31
3,506,770  4/1970  Schikarski et al. .................. 13/23

Primary Examiner—Roy N. Envall, Jr.
Attorney, Agent, or Firm—Stevens, Davis, Miller & Mosher

[57] ABSTRACT

A furnace for the pyrochemical processing of nuclear reactor fuel elements comprises a vertical tube which is adapted to receive the fuel element. The bottom of the tube has a graphite filter element connected to at least one closable aperture through which, in turn, molten metal and molten salts may be introduced firstly to effect dissolution of the stainless steel sheaths of the fuel rods and secondly to pulverize and remove the fuel in the molten salts through the filter.

4 Claims, 4 Drawing Figures

3,787,598

FURNACE AND METHOD FOR THE PYRO-CHEMICAL PROCESSING OF NUCLEAR REACTOR FUEL ELEMENTS

This invention relates to a furnace and method for the pyrochemical processing of nuclear reactor fuel elements, and more particularly to a furnace in which two processes which are described in earlier patent specifications of the present Applicant can be performed in combination, namely a method of removing nuclear reactor fuel element linings as described in U.S. Pat. No. 3,666,425 and a method of processing nuclear reactor fuel as described in U.S. Pat. specification No. 3,399,977. The description of the present invention in this specification relates particularly to a furnace for processing rapid reactor fuel elements, although the furnace can also be used for other purposes. In a particular aspect the invention relates to a furnace in which the sheaths are firstly removed from rapid reactor fuel elements and thereafter the fuel is pulverized for further treatment with an aqueous solution, such as dissolution in nitric acid and separation of uranium and plutonium by selective organic solvents.

The hitherto-known methods of preparation, before the irradiated fuel is dissolved in nitric acid, such as the mechanical chopping of the fuel elements and their sheaths which may be for example of stainless steel, (the so-called "chop and leach" method) still have a number of disadvantages for processing rapid reactor fuel elements, for instance:

a. Liquid sodium cooled rapid reactor fuel elements can be contaminated by adhering sodium, and if the sheaths are broken during the reactor operation they may even contain sodium which must first be removed before the chop and leach method can be used.

b. The relatively complex geometrical shape of a rapid reactor fuel element which is usually an oblong structure or sleeve of hexagonal cross-section comprising a large numer of pencil-thin fuel rods jacketed with stainless steel) is not very suitable for the rough mechanical treatment of the chop and leach method.

c. The relatively large quantity of iodine in the rapid reactor fuel elements reduces the efficiency of the direct use of organic solvent, preliminary removal of the iodine being desirable.

d. Rapid reactor fuel elements contain a large amount of plutonium and can therefore become critical; moreover, the processing of the elements releases more heat than with normal fuel elements, so that satisfactory thermal control of the process is desirable.

It has now been discovered that these disadvantages can be obviated by combining the method of removing fuel element jacketing by means of liquid metals, as described in the aforementioned, U.S. Pat. No. 3,666,425 with the method of treating irradiated nuclear reactor fuels with molten salts as described in the aforementioned U.S. Pat. No. 3,399,977.

According to the present invention there is provided a furnace for the pyrochemical processing of nuclear reactor fuel elements, which furnace comprises a vertically disposed tubular member comprising at least one outer jacket of refractory material having a graphite lining, the furnace being closable at its uppermost end but provided with a gas outlet port, the inside of the graphite lining being adapted to receive a nuclear reactor fuel element, the furnace further comprising at its lower end a graphite filter element which is adapted to support and communicate with the fuel element, and at least one closable discharge aperture connected to said filter element.

The present invention also provides a method of pyrochemically processing nuclear reactor fuel elements which method comprises introducing a nuclear reactor fuel element into a furnace as described above, heating the furnance, introducing molten metal into contact with the reactor fuel rods of the fuel element through one of the closable discharge apertures so as to dissolve the steel sheaths of the fuel rods draining the molten metal from the furnace, introducing a molten salt or salt mixture into the furnace to pulverize the fuel, removing the molten salt containing the finely divided fuel from the furnace, and thereafter flushing the fuel element grid or jacket with a molten salt or salt mixture to complete the removal of the fuel from the fuel element grid or jacket.

A furnace in accordance with this invention will now be described by way of example with reference to the accompanying drawings, in which.

In all the drawings like members have like reference numerals. First the processing method will be described in broad outline and then illustrated with reference to the drawings. The method is performed in three stages.

1. In a first stage the fissile fuel element to be processed is brought into contact in the furnace at elevated temperature with the liquid metal used as a solvent to remove the stainless steel jacketing. After only a few minutes the thin casings (which are approximately 0.3 mm thick) of the pencil-thin fuel rods ar dissolved, while the grid or stainless steel jacket of thicker material (which is approximately 3 mm thick) is still intact. At this moment this first treatment can be interrupted. The fuel falls apart into large pieces and remains mainly in the furnace, although a portion can be removed with the liquid metal. The metal used as a solvent is usually an alloy of antimony and copper. The remaining jacket or grid of the fuel element is removed from the furnace only after the whole method has been completed.

2. After the removal of the liquid material, the molten salt (in this case a mixture of $NaNO_3$ or $Na_2O$) is introduced into the furnace to disintegrate and pulverize the fuel completely by the following reactions:

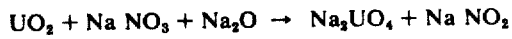

$$UO_2 + Na\ NO_3 + Na_2O \rightarrow Na_2UO_4 + Na\ NO_2$$

or

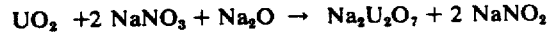

$$UO_2 + 2\ NaNO_3 + Na_2O \rightarrow Na_2U_2O_7 + 2\ NaNO_2$$

The resulting pulverulent uranate and pulverulent plutonium compounds are removed from the furnace with the molten salt.

3. The furnace is then flushed with a second liquid salt mixture, for instance $Na_2S_2O_7$ or $K_2S_2O_7$, to convert the last remains of the fuel into uranyl sulphate type compounds soluble in the molten salt. The fuel element grid or the remaining stainless steel jacket are then removed from the furnace.

The nuclear fuel is recovered from the liquid metal (containing slight traces of pulverulent material) by screening the metal through graphite cloth, graphite felt or filters of high-melting metals; the nuclear fuel is recovered from the molten salt from the second stage by filtering the metal through similar filter materials, and from the molten salt of the third stage by treating the metal with, for example NaOH or $Na_2O$, whereafter the fuel is again precipitated as oxide and can be filtered off.

Some or all of the treatment liquids, more particularly the molten salt of the third stage, can be recycled. The resulting fuel powder is given a further wet processing in known manner. The whole method of preparation takes less than one hour per fuel element.

Figure 1:
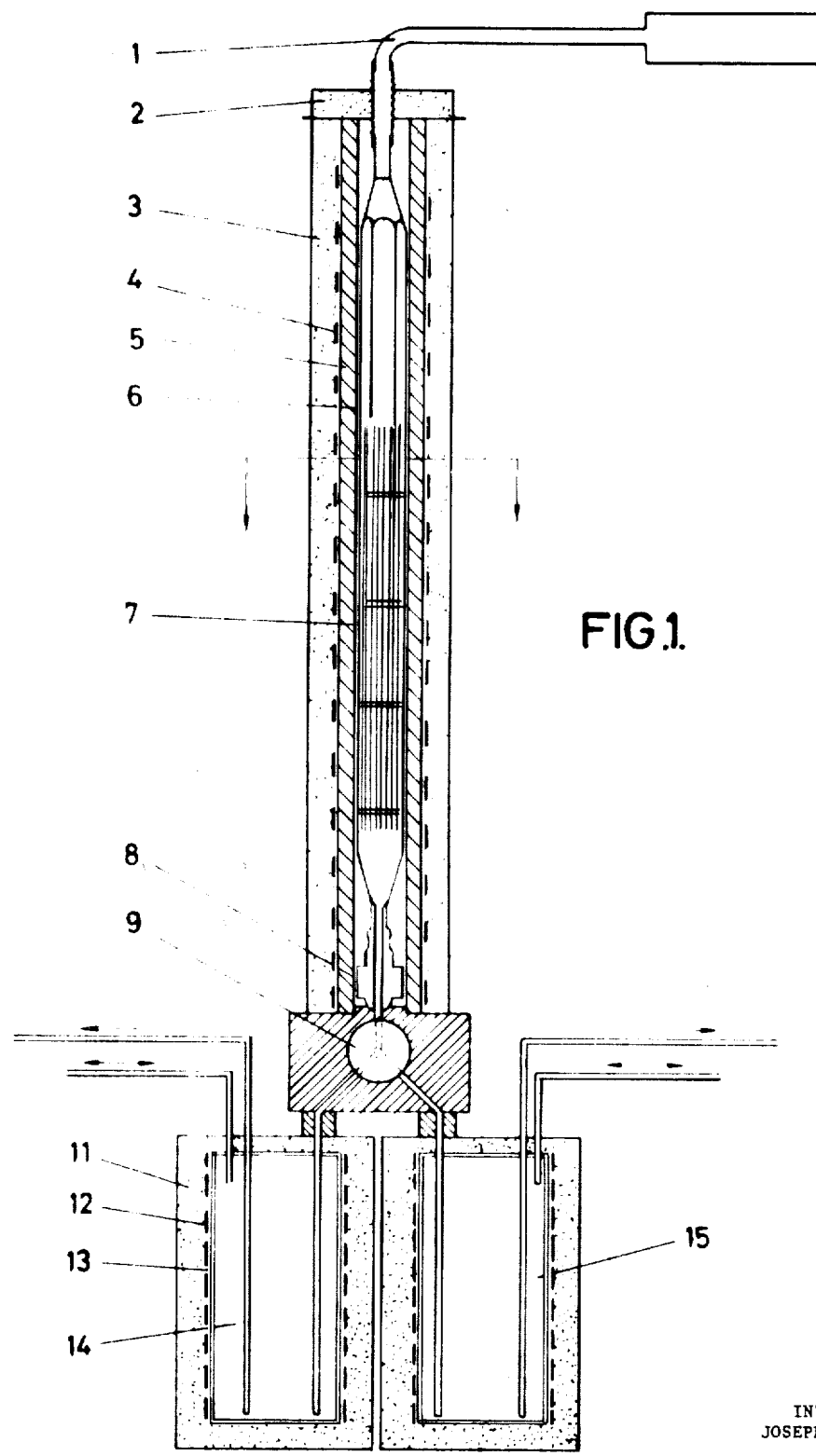
FIG. 1 shows the furnace in partial longitudinal section.
Figure 2:
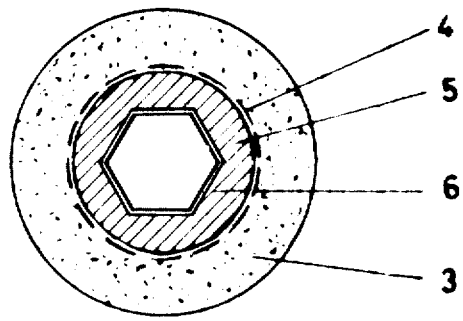
FIG. 2 is a cross-section at 2—2 of FIG. 1.
Figure 3:
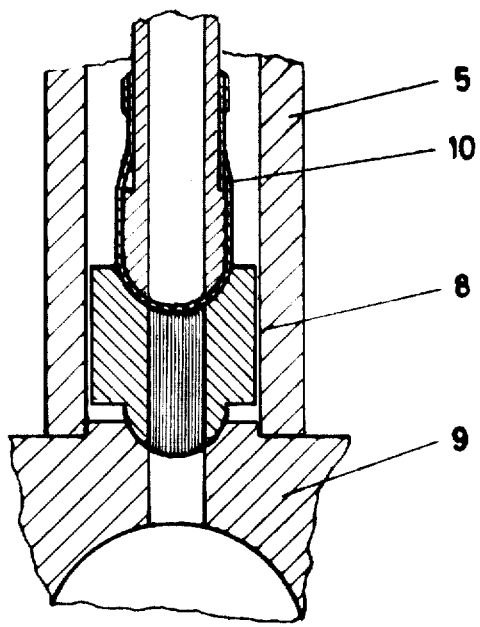
FIG. 3 is an enlarged view of a part of FIG. 1 showing the graphite filter element.
Figure 4:
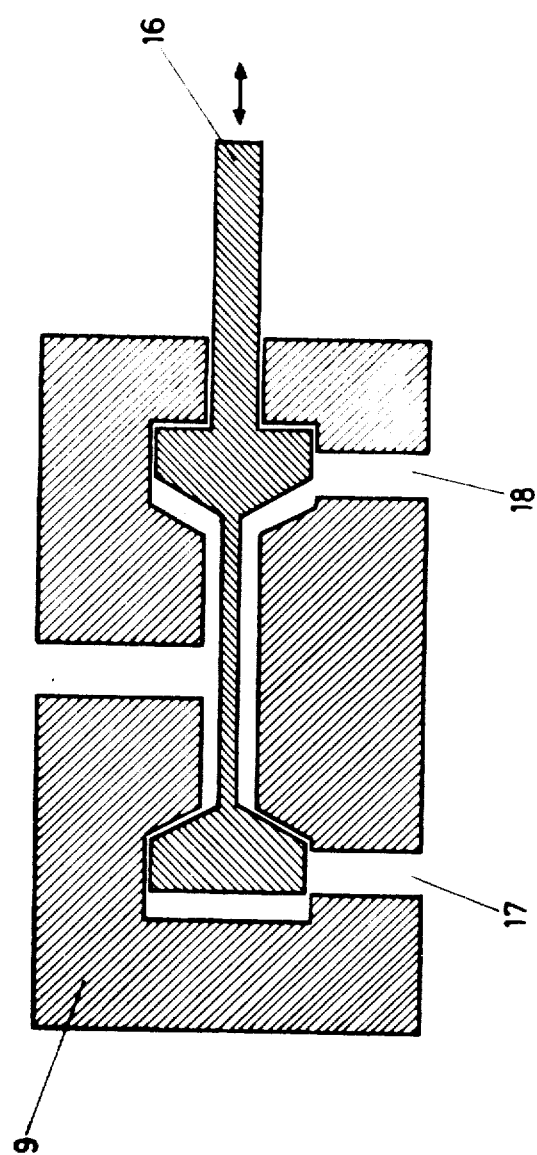
FIG. 4 shows an example of a closable discharge aperture.

The furnace in which the three stages of the method are performed takes the shape of a vertical cylinder longer than the fuel element to be treated therein. The graphite lining or crucible 5 is preferably of hexagonal inner diameter and is therefore adapted to the shape of the majority of rapid reactor fuel elements in use. Conveniently an electric heating element 4 and a heat-resistant outer jacket 3, for example, of aluminium oxide or zirconium oxide, is disposed around the inner lining. An outer jacket, if necessary coolable, can be disposed around the whole. The electric heating element must be adapted to keep the furnace at a temperature of, for example, 800° C. In the embodiment illustrated the fuel element 6,7 fits into the furnace with a clearance of a few millimeters. The top of the fuel element is directly connected to a gas flow aperture 1 in a cover 2 hermetically sealing the furnace. The furnace bottom comprises a block of graphite 9 formed with at least one closable discharge aperture. Preferably, however, the block 9 has two apertures closable independently of one another, as shown in FIG. 4. A graphite valve 16 can be reciprocated in the block to bring either the aperture 17 or 18 into contact with the furnace. Disposed between the base of the fuel element 6,7 and the block 9 is a graphite filter element 8. FIG. 3 shows how the filter element can simply consist of a piece of graphite having a shape adapted to the fuel element base and formed with a number of bores having an inside diameter of, for example, 0.5–1 mm, so that only pulverulent material can pass through, but no large pieces of fuel. For the same purpose a graphite cloth or a metal mesh or piece of gauze of a high-melting metal 10 is disposed around the fuel element base. The graphite cloth or piece of gauze retains small pieces of metal and fuel during the first stage of the method and can even be so disposed that the liquid materials (antimony-copper alloy and molten salts) circulate exclusively inside the fuel element jacket 6, so that the fuel element acts as a primary melting crucible in the furnace according to the invention. FIG. 1 shows vessels or reservoirs 14, 15 disposed beneath the furnace. The reservoirs 14, 15 are connected to the furnace and have lines for the supply and discharge of liquid material and pressure and/or suction lines. The reservoirs 14,15 can have electric heating elements 12 between graphite inner wall 13 and outer wall 11 of heat-resistant material. FIG. 1 shows a stationary assembly having two vessels, one 14 for liquid metal and one 15 for molten salt, but a stationary assembly having, for example, one or three vessels may be used. Alternatively the furnace can be displaced horizontally — e.g., driven on rails — to be moved above the required reservoir in the various stages of the method, or the reservoirs can be displaceable and the furnace mounted stationary. Operations can also be performed with a single reservoir which is emptied after each stage of the method and then filled with the next liquid material.

The molten salts and liquid metals are introduced into the furnace at pressure and removed therefrom by suction. The electric heating can maintain the contents of the reservoirs at a temperature of 950°–1,000° C. The reservoirs may be connected to other reservoirs (not shown) which have graphite cloth or felt filer elements to filter off pulverulent fuel.

The operation of the furnace which has been described by way of example, is as follows:

The fuel element is transferred from its storage place to the furnace and introduced thereinto after filter 10 has been placed on the block 8. When the gas discharge 1 has been connected, the furnace is closed by the cover 2. The graphite valve is then adjusted to connect the furnace to vessel 14. The furnace is heated to a temperature of 800° C and the antimony-copper alloy in the vessel 14 is heated to a temperature of 950° C. Pressure is then exerted via a pressure line on the liquid metal in the reservoir 14 and the metal is allowed to rise into the furnace just as far as the top of the thin fuel rods in the element 6,7. The metal is allowed to act for a few minutes and the released fission gas is permitted to escape through aperture 1. The level of the liquid metal is then raised to above the fuel element. During this phase the liquid metal can be pulsated by the application of suction and pressure to produce satisfactory agitation. The molten metal is then drained away to vessel 14, entraining a small quantity of finely pulverulent fuel. The valve 16 is then changed over and the furnace connected with the vessel 15. The molten salt mixture of sodium nitrate and sodium oxide, which has in the meantime been heated to a temperature of about 500° C, is forced into the furnace and pulsated in the same manner as described hereinbefore with regard to the liquid metal. After the molten salt has been removed, substantially all the fuel is present in finely divided but undissolved form in the vessel 15. This operation can be repeated several times.

The last remains of fuel in the element 6,7 can be removed with molten $K_2S_2O_7$ from a reservoir which is not shown. Since only a small amount of fuel still remains dissolved in the molten salt, the salt can be re-used many times before requiring reprocessing. The other steps of the method, such as: filtration of the liquid metal from the vessel 14 and of the molten salt from the vessel 15; the conversion of the pulverulent fuel by the wet process; the recovery and recycling of the used liquid material; and the processing of the used molten $K_2S_2O_7$ are not important for understanding the operation of the furnace according to the invention.

The main advantages of the furnace according to the invention as hereinbefore specifically exemplified are as follows:

a. Compactness. The following can be eliminated: an installation for removing adhering sodium from the used fuel elements; a detection system for tracing damage to the fuel elements (the fuel elements can readily be dealt with in the furnace according to the invention); and a device for chopping the elements. The furnace with its accessory apparatus is so compact that it can even be disposed in a radiation-screened room near the nuclear reactor, thus obviating the dangerous transportion of fuel elements in liquid sodium to a processing factory.

b. Operation. The furnace can readily be remote-controlled and automated in a very simple manner.

c. Radioactive waste. The furnace produces no waste in aqueous solutions, but only gases and solids (congealed used salt and metal) which can be more readily processed than the frequently large quantities of liquid produced in the known methods.

d. Construction. The furnace is so simple as to cause no constructional difficulties. The constructional materials used, such as graphite, pyrographite and zirconium oxide are commercially available and can readily be processed in known manner. Nor is there any diffculty in adapting the inside shape to the dimensions of the fuel element to be treated.

What I claim is:

1. A furnace for pyrochemically processing nuclear reactor fuel elements comprising:
   a. a vertically disposed tubular member having an outer jacket of refractory material with a graphite lining adapted to receive a nuclear fuel element;
   b. heating means for said tubular member;
   c. closure means for the upper end of the furnace having a gas outlet port;
   d. a graphite filter element at the lower end of the furnace adapted to support and communicate with the fuel element;
   e. at least one closable discharge aperture connected to said filter element.

2. The furnace of claim 1 including two discharge apertures closable independently of one another by means of a two way graphite valve.

3. The furnace of claim 1 in which the graphite lining has a hexagonal inner cross-section.

4. The furnace of claim 1 including an outer cooling jacket.

* * * * *